Oct. 23, 1923.

E. R. FELL

STEERING MECHANISM

Filed Aug. 16, 1919

1,471,553

2 Sheets-Sheet 1

WITNESS:
Gustav Genzlinger.

INVENTOR
Elwood R. Fell
BY
Cyrus N. Anderson
ATTORNEY

Oct. 23, 1923.                                                              1,471,553
                              E. R. FELL
                         STEERING MECHANISM
                        Filed Aug. 16, 1919          2 Sheets-Sheet 2
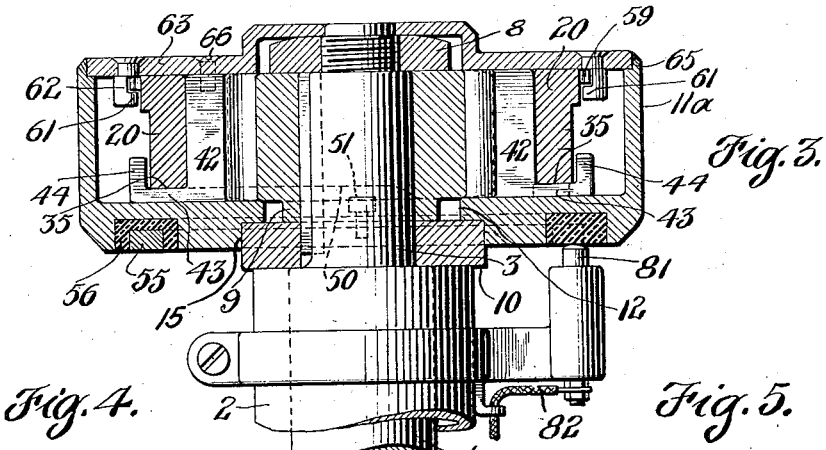
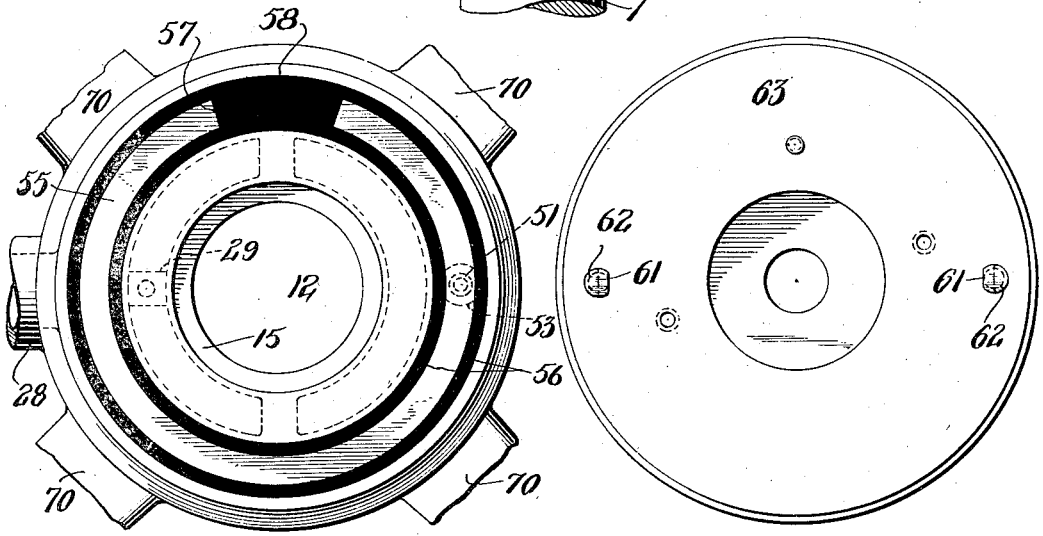
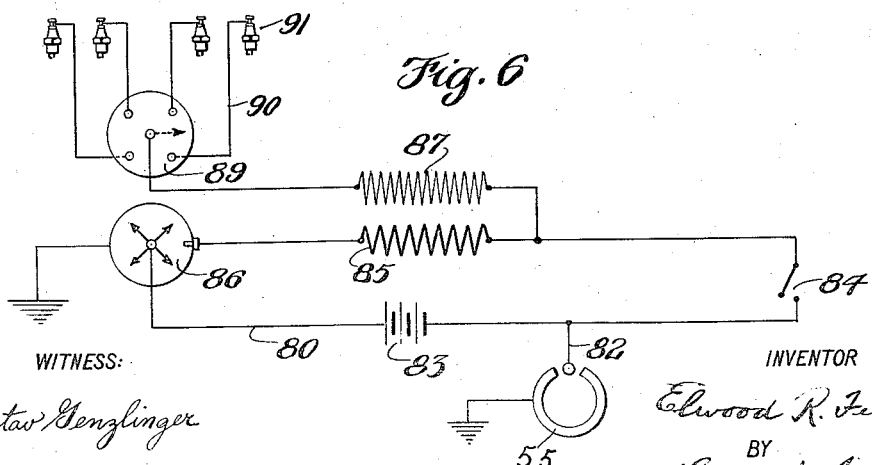
WITNESS:                                                    INVENTOR
Gustav Genzlinger                                    Elwood R. Fell
                                                          BY
                                                      Cyrus N. Anderson
                                                           ATTORNEY Patented Oct. 23, 1923.

1,471,553

UNITED STATES PATENT OFFICE.

ELWOOD R. FELL, OF PHILADELPHIA, PENNSYLVANIA, ASSIGNOR TO HARVEY J. FIET, OF PHILADELPHIA, PENNSYLVANIA.

STEERING MECHANISM.

Application filed August 16, 1919. Serial No. 317,863.

*To all whom it may concern:*

Be it known that I, ELWOOD R. FELL, a citizen of the United States, and a resident of Philadelphia, in the county of Philadelphia and State of Pennsylvania, have invented an Improvement in Steering Mechanism, of which the following is a specification.

This invention relates to improvements in steering mechanism for automobiles and other vehicles, and it has for its object generally to provide means whereby the steering wheel or other steering means may be connected with and disconnected from the steering shaft or other steering member as may be desired, which is simple in construction and which when once disconnected from the steering shaft or other member cannot be reconnected therewith except by use of a proper key provided for the purpose.

The invention also has for its object to provide an improvement in the means for preventing access to the means for connecting and disconnecting the steering wheel or other controlling member from the steering shaft.

A further object of the invention is to provide means whereby when the car is not in use, and when the steering wheel or other controlling device is in disengaged relation with respect to the steering shaft or other member, the ignition circuit may or may not be grounded, as desired.

Other objects and advantages of the invention will be pointed out in the detailed description thereof which follows, or will be apparent from such description.

Figure 1:
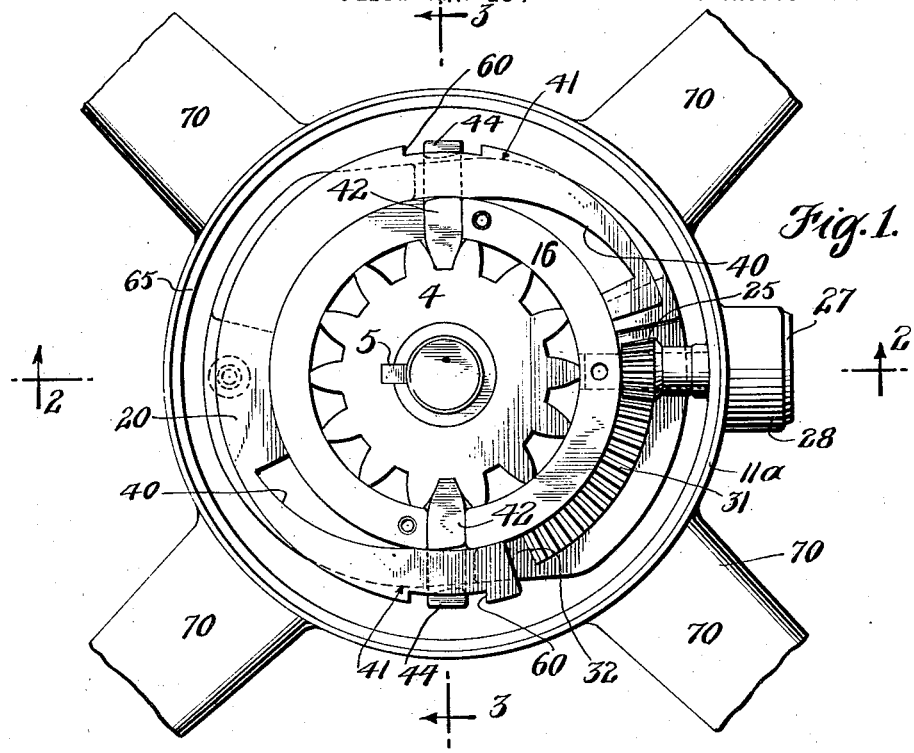
Figure 2:
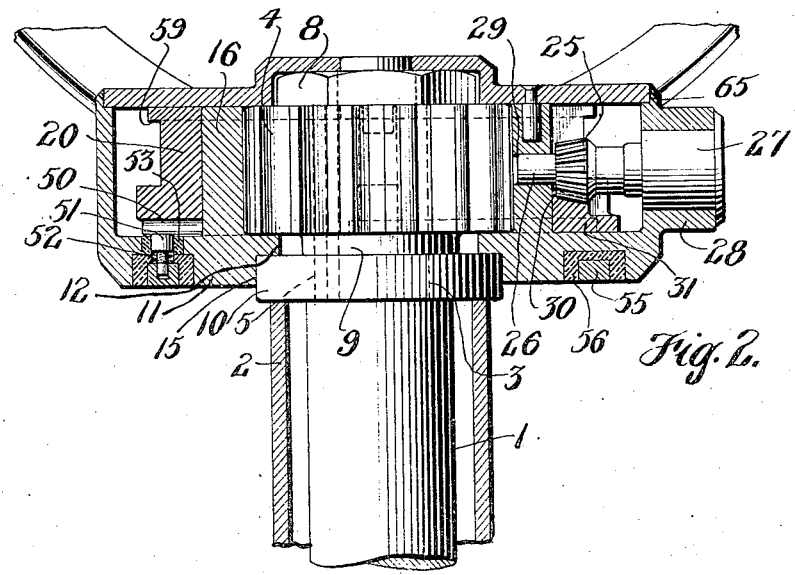

In order that my invention may be understood more readily and its many practical advantages be more fully appreciated, reference should be made to the accompanying drawings in which I have illustrated one convenient form of embodiment thereof. It is understood, however, that it is susceptible of embodiment in other forms of construction than that shown and that changes in the details of construction and arrangement may be made within the scope of the claims without departing from the said invention.
In the drawings, Fig. 1 is a top plan view of the device embodying my invention, the top or cover thereof being removed in order that the details of construction may be disclosed; Fig. 2 is a vertical sectional view taken on the line 2—2 of Fig. 1, the top or cover being shown in place; Fig. 3 is a vertical sectional view taken on the line 3—3 of Fig. 1, the top or cover being shown in place; Fig. 4 is a bottom plan view of the device removed from the steering shaft; Fig. 5 is a bottom plan view of the top or cover of the device; and Fig. 6 is a wiring diagram, showing the ignition circuit and also showing the relation of said circuit to the device constituting my invention.

In the drawings, 1 designates the steering shaft for an automobile or other kind of vehicle, or any other analogous structure requiring or employing steering mechanism. The shaft 1 is supported within a tubular post or column 2. The upper end of the shaft is provided with a reduced portion 3, which projects through the mechanism embodying the invention. 4 designates a circular rack or gear which is connected to the steering shaft 1 to rotate therewith by means of a key 5. The rack or gear 4 is retained upon the reduced end portion 3 of the shaft 1 by means of a nut 8. The lower side of the rack or gear 4 is provided with a boss 9 which rests upon a collar 10, the lower side of which is seated against the shoulder between the reduced end portion 3 and the larger portion of the shaft 1.

11 designates a relatively flat casing which may be described generally as of cup shape, the outer wall being designated 11$^a$. Its bottom is provided with a central opening 12, through which the reduced end portion 3 of the steering shaft 1 extends, and within which the boss 9 is situated. The lower side of the bottom of the member 11 is cut out or rabbeted to form a groove at 15. The upper outer edge portion of the collar 10 is seated or fitted in this groove. The lower side of the horizontally projecting annular part of the bottom of the casing 11 forming the upper side of the groove 15 rests upon the upper side of the collar 10, as is clearly shown in Figs. 2 and 3 of the drawing.

Concentric with respect to the outer wall 11$^a$, of the member 11 and spaced a distance therefrom, I have provided an inner wall 16, the inner surface of which is located in adjacent relation to the outer ends of the teeth of the circular rack or gear 4.

20 designates an annular or ring-like cam member which is situated within the space intermediate the outer and inner concentric walls 11 and 16 of the casing member 11ᵃ. The said annular or ring-like cam member is situated preferably in contact with, or in adjacent relation with respect to the concentric inner wall 16. The said member 20 rests upon the bottom of the casing member 11 and is adapted to be rotated through a partial revolution by means of a bevel gear 25 adjacent the inner end of a shaft 26 the outer end of which extends into a lock structure 27, supported and secured in an opening in the tubular projection 28, formed upon the outer wall 11ᵃ, of the casing member 11. The inner end of the shaft 26 extends into an opening 29 in the inner wall 16. By means of a key the shaft 26 may be rotated in either direction to effect corresponding rotation of the cam member 20 in either direction by reason of the engagement of the gear 25 with the teeth of a rack 31 upon the cam member 20. A relatively wide notch 32 is provided in the upper edge of the cam member 20 and the teeth of the rack 31 are formed in the upper side of the the connecting bar at the lower side of said notch.

The member 20 is provided with notches 35 in its lower edge and in diametrically opposed relation with respect to each other. Situated in adjacent relation with respect to these notches are interior and exterior cams 40 and 41 on the inner and outer sides of the cam member 20. These cams are provided for the purpose of effecting operation of the locking members 42 which are adapted to be moved into and out of engagement with the teeth upon the circular rack or gear 4 previously referred to. Each of these locking members 42 is provided with an outwardly extending projection 43 provided with an upturned end portion 44, the latter being situated upon the outer side and in close relation to the rotatable annular cam member 20 and in operative relation to the outer cam 41 situated adjacent the lower edge of the member 20.

The bottom edge of the cam member 20 is provided with an elongated cut-out portion indicated at 50, constituting a depression underneath which is situated an electrical contact 51 which is pressed upwardly by means of a coiled spring 52. The contact 51 is insulated from the bottom of the casing 11 by means of a small ring 53 of insulating material. The contact member 51 is in contact with a contact ring 55 embedded in a ring 56 of insulating material which in turn is embedded in and secured to the under side of the bottom of the casing member 11. As will be noted from an inspection of Fig. 4 of the drawing the contact ring 55 is interrupted as indicated at 57, the ends on opposite sides of such interruption being separated from each other by the insulating material 58 which is, in the construction shown, integral with the insulating ring 56.

The upper outer edge of the cam member 20 is provided with a lateral rim 59 provided with notches as indicated at 60. Said arm 59 is adapted to engage hooks 61 upon the lower ends of projecting lugs 62 upon the lower side of the cover 63, and the said notches are provided for permitting the said hooks 61 to pass down into position to engage the said rim 59 when the cover 63 is placed in position upon the upper side of the casing member 11.

The upper inner edge of the outer annular wall 11ᵃ of the casing member 11 is cut out or rabbeted to form an annular vertical shoulder 65 within and against which the outer peripheral edge of top or cover 63 is seated. The outer upper edge of said cover is flush with the top edge of the wall 11ᵃ, as is shown in Figs. 2 and 3 of the drawings. Such relationship is provided in order to render it as difficult as possible, if not impossible, to pry the cover 63 from the casing.

In the drawings I have illustrated the locking members 42 in their innermost positions in engagement with the teeth of the circular rack or gear 4. In order to cause disengagement of the said locking members from the said rack it is only necessary that the cam member 20 be caused to rotate in a counter-clockwise direction. This rotation is effected by the insertion of a key into the lock 27 and by means thereof effecting rotation of the shaft 26. The lock 27 and its shaft 26 being held in stationary position upon the casing 11, rotation of the said shaft effects rotation of the cam member 20 in either counter-clockwise or clockwise direction depending upon the direction of rotation of said shaft. When the cam member 20 is rotated in counter-clockwise direction from the position shown in Fig. 1 the cams 41 on the outer side thereof engage the upturned portion 44 of the projections 43 and move the locking members 42 outwardly and effect disengagement thereof from the teeth of the circular rack or gear 4. Upon rotation of the cam member 20 in the opposite direction to return it to the position shown in the drawings the cams 40 contact with the outer edges of the locking members 42 and cause inward locking movement thereof. When the cam member 20 has been moved into position to disengage the locking members 42 from the rack or gear 4 it will be noted that the rim 59 has passed above and into engagement with the hooks 61, so that it is impossible to remove the cover 63 even though the retaining screws 66 attaching it to the inner wall 16 of the casing 11 may be removed. When the locking members have thus been disengaged from the circular rack or gear 4 it is apparent that the steering wheel, not shown, which is supported upon the radial arms 70 may be rotated without affecting the gear shaft 1. When, however, the cam member 20 is in the position shown in the drawings the casing member 11 is by means of the locking members 42, locked to or connected with the said steering shaft 1 so that operation or turning movement of the steering wheel effects a corresponding movement of the casing 11 and of the steering shaft 1.

When the casing 11 is locked to the steering shaft 1, as shown in the drawings, the cam member 20 is in such position that the contact 51 is situated in the depression at 50 in the bottom edge of the cam member 20. When, however, the latter is turned counter-clockwise, to disengage the locking members 42 from the circular rack or gear 4, the bottom edge of the cam member 20 adjacent one end of the said depression 50, engages the said contact 51 to ground the electric circuit 80 which has electrical connection with the spring pressed contact member 81, by means of an extension at 82. The contact member 81 normally is in contact with the contact ring 55.

The ignition circuit which has been designated as a whole by the reference number 80 comprises a source of electrical energy which may be an accumulator or storage battery of any approved type as indicated at 83, a switch 84, a primary winding 85 of an induction coil and a timing device 86. The secondary circuit comprises the secondary winding 87, and the distributer mechanism 89 having a plurality of spark circuits 90 connected with spark plugs 91. The construction and operation of ignition circuits of this character are well known and understood so that no further description thereof will be given.

As previously stated the contact member 81 normally is in contact with the contact ring 55. The ignition circuit, however, is not thereby grounded because at such time the contact member 51 is not in contact with any part of the operating mechanism, as for instance the cam member 20. When, however, the cam member 20 has been turned into position to disengage the locking members 42 from the circular rack or gear 4, as has been previously described, the said member 20 is brought into contact with the contact 51, so that the ignition circuit may be grounded, in which case operation of the engine is discontinued. In case it should be desired to continue the operation of the engine, as in a period of cold weather when it is desirable that the engine and other associated parts should be kept warm, the steering wheel and the casing 11 to which it is connected may be turned into position to bring the portion 58 of the insulating ring 56 into contact with the spring pressed contact member 81. When the latter is in contact with the insulation at 58 the ignition circuit is not grounded through contact 81, with the result that the engine continues to operate, but this does not in any way impair the safety of the device; that is, its efficiency in preventing operation of the steering shaft to steer the car, because the casing 11 and the steering wheel connected therewith are at such time disconnected from the circular rack or gear 4, so that the steering wheel and the casing 11 connected therewith are free to rotate on and independently of the steering shaft.

For convenience, the member 4 secured to the steering shaft has been termed a circular rack or gear, but in using such terms, I do not wish to restrict myself beyond the fact that the member is substantially of a circular character and has one or more notches in the peripheral edge for receiving the locking member or members.

It will be seen that I have provided an efficient and simple construction of steering mechanism designed and adapted to enable a person to disconnect the steering wheel from the steering shaft to prevent operation of the latter, the means for connecting the steering wheel and the steering shaft being completely inclosed within a chamber and inaccessible to any one not provided with a key for operating the lock 27. The mechanism designed by me is particularly efficient because the means for effecting connection and disconnection of the casing 11 with and from the steering shaft is provided with means for engaging and locking the top or cover upon the casing upon disconnection of the said casing from the said steering shaft.

I claim:

1. In a device of the character described, the combination of a steering shaft, a steering wheel comprising a central casing supported upon the said shaft, an annular rotatable cam member, and a locking member carried by the said casing, said locking member having parts situated on the inner and outer sides of said rotatable cam member whereby rotary movement of said cam member is adapted to cause the said locking member to move in and out, depending upon the direction of movement of said cam member, to engage and disengage a part rigid with the said shaft.

2. In a device of the character described, the combination of a steering shaft having at its upper end a circular notched member, a casing secured to the upper end of the said shaft, the said circular notched member being situated within the said casing and being surrounded by an inner concentric wall of said casing, said wall having slots therein, locking members situated in said slots, an annular cam member surrounding and situated in adjacent relations to the said concentric wall, said member being provided with cam surfaces adapted to contact with portions of the said locking members on opposite sides thereof, and means within the casing for effecting rotary movement of the said cam members to cause movements of the said locking member to engage or disengage the said circular notched member as desired.

3. In a device of the character described, the combination of a steering shaft, a casing supported upon the upper end of said shaft, a cam member having cam surfaces upon opposite sides thereof, means for causing movement of said cam member, and locking means for connecting and disconnecting said casing with and from the steering shaft, said locking means comprising radially movable members, respectively having portions on opposite sides of said cam member in contact with said cam surfaces whereby upon movement of said cam member positive radial movements of said locking member are effected.

4. In a device of the character described, the combination of a steering shaft, a casing supported upon the upper end of said shaft, said casing being provided with an insulated electrical contact member, means for interlocking the said casing with the said shaft so as to cause the said casing and the said shaft to rotate relatively or together as desired, means for controlling the said interlocking mechanism, an ignition circuit having electrical connection with the said insulated contact member, and means for grounding the said circuit when the said casing and steering shaft are in disconnected relation with respect to each other.

5. In a device of the character described, the combination of a steering shaft, a casing at the upper end thereof which is adapted to rotate with or independently of said shaft, said casing being provided with an insulated electrical contact circular ring-like member, an ignition circuit having electrical connection with said circular ring-like member, interlocking means for connecting and disconnecting said casing from said shaft, means for controlling said interlocking means, and means for electrically connecting the said ignition circuit with the said last mentioned means when the latter is turned into position to disconnect the said casing from the said steering shaft to put said ignition circuit out of operation.

6. In a device of the character described, the combination of a steering shaft, a casing secured upon its upper end which is adapted to rotate independently of or in unison with the said shaft, said casing being provided with an electrical contact member, said contact member being insulated from said casing, an ignition circuit having electrical connection with the said contact member, interlocking means for connecting and disconnecting the said casing from the said shaft, an annular cam member having cam surfaces for engaging parts of the said interlocking means to effect movement thereof into and out of locking position, means for actuating said cam member and means for electrically connecting the said cam member with the said contact member when the said cam member is in position to effect disengagement of the said locking means from the said steering shaft.

7. In a device of the character described, the combination of a steering shaft, a casing supported upon said shaft, an ignition circuit having electrical connection with said casing, locking devices for connecting and disconnecting said casing with and from said shaft whereby the said casing and shaft may be rotated in unison or independently as desired, and means whereby when the said locking devices are in unlocked relation with respect to the said shaft, the said ignition circuit may or may not be grounded as desired.

8. In a device of the character described, the combination of a steering shaft, a steering wheel, means for connecting and disconnecting said wheel with and from said shaft, an ignition circuit, and means whereby the said circuit may or may not be grounded when the said steering wheel is in disconnected relation with respect to the said steering shaft as desired.

9. In a device of the character described, the combination of a steering shaft, a steering wheel provided with a central casing, means within said casing for connecting and disconnecting said steering wheel from said steering shaft, a cam member also within said casing for controlling said means, an ignition circuit, means for electrically connecting said circuit with said cam member when the latter is in position to effect disconnection of said steering wheel from said shaft, and means whereby at such time the said circuit may or may not be grounded, substantially as described.

10. In a device of the character described, the combination of a steering shaft, a steering wheel having a central casing through which the upper end of said shaft projects, an electrical contact circular ring-like member secured upon said casing and insulated therefrom, the opposite ends of said ring-like member being spaced from each other, insulating material in the space between the said ends, locking devices for connecting and disconnecting the said steering wheel with and from the said steering shaft, an annular cam member having cam surfaces for actuating the said locking device, means for electrically connecting the said cam device with the said contact ring-like member when the latter is in position to disengage the said locking devices from said steering shaft, the said steering wheel together with the said casing being adapted to be moved into positions when disconnected from said steering shaft with the said ignition circuit in electrical connection with the said contact ring-like member or the insulating material intermediate the opposing ends thereof, substantially as described.

11. In a device of the character described, the combination of a steering shaft, a casing at the upper end of said shaft, said casing being adapted to support the rim of a steering wheel, locking means for connecting and disconnecting said casing with and from the said steering shaft, a device for actuating said locking means, a cover for the said casing, and notched projections depending from said cover for interlocking the said cover with the said device when the latter is moved into position to disengage the locking means from the said steering shaft.

12. In a device of the character described, the combination of a steering shaft, a steering wheel having a casing at its centre, said casing having a central opening through which the upper end of the steering shaft extends, a top or cover for said casing, said cover having notched lugs upon its under side, locking devices within said casing and supported thereby for connecting and disconnecting the said steering wheel with and from the said steering shaft, an annular cam device also situated in said casing, said device having cam surfaces for engagement with the said locking devices to actuate the same, and the said cam device having means for engaging the notches in said lugs when the said cam device is moved into position to disengage the said locking devices from the said steering wheel, and means for effecting movement of the said cam device.

13. In a device of the character described, the combination of a steering shaft, a steering wheel having a central casing, said casing being provided with a central opening through which the upper end of the said steering shaft extends, a cover for said casing, said cover being provided with lugs projecting from its under side which lugs are provided with notches, radially moving locking devices situated within the said casing and adapted to engage and disengage the said steering shaft to connect and disconnect the said steering wheel with and from the said shaft, an annular cam member within said casing having cam surfaces adapted to engage the said locking devices, said cam device also having a rim which is adapted to engage the notches in said lugs when it is moved into position to disengage the said locking devices from the said steering shaft, and means for actuating the said cam device.

14. In a device of the character described, the combination of a steering shaft, provided with a circular notched member, a steering wheel having a central casing provided with an opening through which the end of said steering shaft extends, and in which the said circular notched member is situated, radially movable locking devices situated in said casing, and adapted to be moved into and out of engagement with the said circular notched member, an annular cam member having exterior and interior cam surfaces for engaging the said locking devices to effect radial inward and outward movement thereof, and means for rotatably moving the said cam member for actuating the said locking devices.

15. In a device of the character described, the combination of a steering shaft having a circular notched member at its upper end, a steering wheel having a central casing provided with a central opening, through which the upper end of said shaft extends, said circular notched member being situated in said casing, radially movable locking devices for engaging and disengaging the said circular notched member said locking devices having outwardly extending projections, a cam member having exterior and interior cam surfaces, the latter being adapted to contact with the outer sides of the said locking devices and the former being adapted to contact with the said projections, to effect inner and outer radial movements of the said locking devices, and means for actuating the said cam member, substantially as described.

16. In a device of the character described, the combination of a steering shaft, having a circular notched member at its upper end, a steering wheel having a central casing provided with a circular opening through which the upper end of said shaft extends and in which casing the said circular notched member is situated, a top or cover for the said casing, locking devices within said casing for connecting and disconnecting the said steering wheel from the said steering shaft, an annular cam member situated within the said casing having interior and exterior cam surfaces which are adapted to contact with the said locking devices to cause inward and outward movement thereof, means for moving the said cam member to actuate the said locking devices, and means intermediate the said cam member and the said top or cover whereby when the said cam member is moved into position to disengage the said locking devices from the said circular notched member the said top or cover is locked in closed position.

17. In a device of the character stated, the combination of the steering shaft, a steering wheel loosely journaled thereon and adapted to rotate independently thereof, locking means for connecting and disconnecting the shaft and wheel comprising a radially movable engaging member and manually operable means for radially moving the engaging member into locking position and having a movable part extending transversely of the direction of movement of the engaging member and passing between spaced portions of said engaging member whereby the latter is positively held in any position to which it may be adjusted.

18. In a device of the character stated, the combination of a steering shaft, a steering wheel therefor loosely journaled thereon, means for temporarily locking the steering wheel to the shaft, an ignition system for a motor, means operated by the locking means when unlocked for putting the ignition system out of operation, and a circuit controlling means in conjunction with the steering wheel when unlocked to control the ignition system to cause it to function whereby said motor may be operated idly to maintain itself warm in cold weather.

19. In a device of the character stated, the combination of a steering shaft, a steering wheel journalled thereon and adapted to rotate independently thereof, locking means for connecting and disconnecting the shaft and wheel, key controlled manually operable means for actuating the locking means, an ignition circuit, and controlling means therefor controlled by the steering wheel when free to rotate independent of the steering shaft, whereby said ignition circuit may be put into or out of operation to permit the engine to be stopped or allowed to continue to operate as desired.

ELWOOD R. FELL.